G. W. GRAVES.
GAS BURNER.
APPLICATION FILED SEPT. 4, 1914.

1,134,122.

Patented Apr. 6, 1915.

Witnesses
Nelson H. Copp
Frederick E. Fox

Inventor
George W. Graves
By Church & Rich
his Attorneys

UNITED STATES PATENT OFFICE.

GEORGE W. GRAVES, OF WASHINGTONVILLE, NEW YORK.

GAS-BURNER.

1,134,122.  Specification of Letters Patent.  Patented Apr. 6, 1915.

Application filed September 4, 1914. Serial No. 860,137.

*To all whom it may concern:*

Be it known that I, GEORGE W. GRAVES, of Washingtonville, in the county of Orange and State of New York, have invented certain new and useful Improvements in Gas-Burners; and I do hereby declare the following to be a full, clear, and exact description of the same, reference being had to the accompanying drawings, forming a part of this specification, and to the reference-numerals marked thereon.

My present invention has for its object to provide a new type of gas burner adapted to be used in conjunction with a gas stove or range and to be employed particularly for heating the oven chamber, the novel features of the burner residing in a three part construction whereby an intense and evenly distributed heat may be produced; a less intensive heat maintained beneath the opposite sides of the oven bottom, or a very moderate degree of heat generated beneath the center of the oven bottom.

To these and other ends the invention consists in certain improvements and combinations of parts, all as will be hereinafter more fully described, the novel features being pointed out in the claims at the end of the specification.

Figure 1:
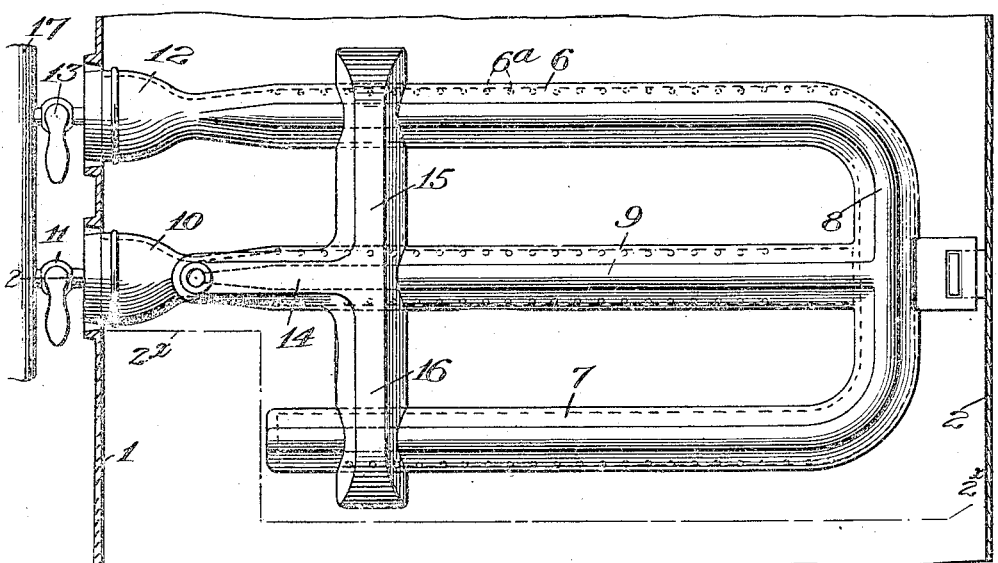
Figure 2:
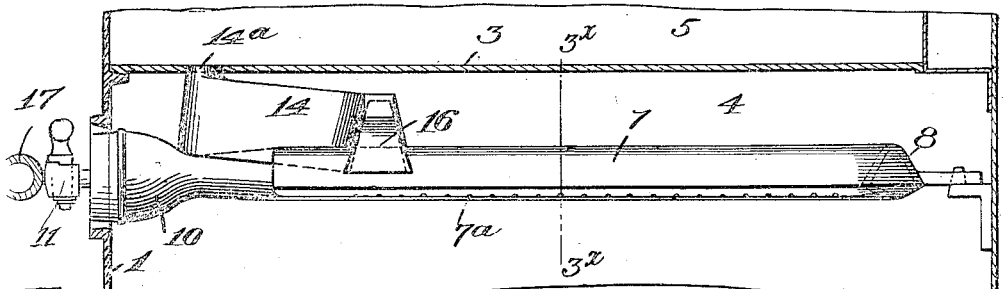
Figure 3:
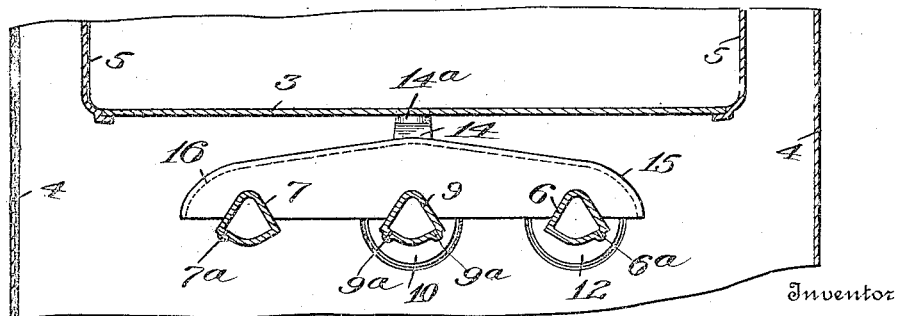

In the drawings: Figure 1 is a top plan view of a burner constructed in accordance with my present invention. Fig. 2 is a side elevation taken along the line $2^x$—$2^x$ of Fig. 1, and Fig. 3 is a cross sectional view taken on the line $3^x$—$3^x$ of Fig. 2.

Similar reference numerals throughout the several views indicate the same parts.

Burners constructed in accordance with my invention, although adapted for other heating purposes, are intended primarily to be employed as the source of heat for ovens of gas stoves or ranges and in the present illustrations I have shown, in the several figures, fragments of a stove, the front and rear plates thereof being indicated by 1 and 2, while the oven bottom which extends between these parts is indicated by 3. In Fig. 3 the side walls of the stove are shown and indicated by 4, as are also portions of the side walls of the oven, which latter are indicated by 5, the space between the walls 4 and 5 at the two sides of the stove comprising the flues through which the heated products of combustion pass upwardly and circulate around the oven chamber, as will be understood.

An oven burner constructed in accordance with my invention may be generally described as U-shaped and having a central tubular portion located intermediate the main arms or side portions of the burner. The latter may be made in a single casting, as shown although no communication exists between the two side arms and the intermediate portion of the burner as the gas supplied to these parts is admitted through separate valves and the flames or jets in the two parts should be independently regulated. The main portion of the burner comprises the parallel side arms 6 and 7 which are united by the curved end portion 8 and are separated more or less according to the width of the oven chamber with which the burner is to be associated. The proper proportion between the parts is shown in Fig. 3 in which it will be seen that the side arms 6 and 7 of the main burner are positioned beneath the center of each lateral half portion of the oven bottom 3. The auxiliary portion of the burner, indicated by 9, lies midway between the parts 6 and 7 and occupies a position beneath the center of the oven chamber. It is supported at its inner end on the curved end 8 of the main burner and at its outer end it is provided with an enlargement, or mixing chamber 10, into which the gas cock 11 discharges. A similar mixing chamber 12 is provided on one of the arms or side pieces of the main burner and receives gas admitted thereto from the cock 13. The gas cocks 11 and 13, it will be understood, are connected to a source of supply such as a gas main or pipe 17. which preferably extends across the front of the stove, the burner being extended rearwardly thus placing the gas cocks in an accessible position and convenient for regulation by the operator.

Both the main and the auxiliary burners may be utilized separately or together according to the temperature which it is desired to obtain but as the main burner is of greater length than the intermediate or auxiliary burner and heats an area more than twice as great as the auxiliary burner, I provide the arms 6 and 7 with gas jet outlets or orifices $6^a$ and $7^a$ situated only on their lateral edges. The central or auxiliary burner 9 is provided with outlet orifices 9ᵃ at both its sides so that when this burner is working to its fullest extent the volume of gas consumed and the heat units generated will be equivalent to that obtained from the two arms of the main burner.

The burners embodying my invention may be constructed in any desired cross sectional shape, but as a further feature of my invention I prefer to make the several arms thereof substantially triangular in cross section, as shown in Fig. 3, and to round the lower surfaces slightly, as shown, so that they will not form eddies in the upwardly moving air currents which impinge against the bottom of the burner. On the latter are provided longitudinally extending ribs formed in the burner along the lines on which the orifices 6ᵃ, 7ᵃ and 9ᵃ are to be drilled. These ribs or beads not only facilitate drilling the orifices in the burner casting but as they project slightly beyond the adjacent surface of the burner a clear cut long tapered flame is obtained. The orifices being drilled at the lateral edges of the bottom portion of the burner and the top parts of the latter being formed by the inclined walls, the gas flames when burning at full head, do not hug or come in contact with the sides of the burner and the latter therefore does not become excessively hot when in operation.

Overlying the burner and preferably located near its forward end is an igniting device or flame conductor which opens into the oven chamber. The igniter is in the form of a shell, open on its lower side, comprising a central portion or stem 14 having lateral extending ends 15 and 16 resting upon and extending slightly beyond the side portions 6 and 7 of the main burner, as well as the central or auxiliary burner 9, whereby the gas emitted from any of the orifices will pass upwardly through the stem and escape through the aperture 14ᵃ therein, at which point it may be ignited by the operator after the opening of the oven door, a precautionary measure which is adopted to obviate the possibility of explosion as a result of an accidental accumulation of gas in the oven chamber.

A gas burner constructed in accordance with my invention is simple in construction, in that it can be made of a single piece of cast metal and efficient in operation because any desired degree of temperature may be maintained and the heat always delivered at such a point or points, that it is evenly distributed beneath the oven bottom. The arrangement of the parts possesses the further advantage in that the gas cocks or valves can be located in the most accessible position at the front of the stove and at the same time the products of combustion distributed equally to the flues at the two sides of the oven under all conditions of operation.

I claim as my invention:

1. A gas burner comprising two connected portions spaced apart and forming a tube continuous throughout its length adapted to receive a supply of gas, and an intermediate portion extending parallel to and between the connected portions and adapted to receive an independent supply of gas.

2. A U shaped gas burner having the two arms each perforated along one of their lateral edges and comprising an intermediate portion perforated along both of its lateral edges, a supply of gas for said two arms and an independent supply of gas for said intermediate portion.

3. A gas burner having two connected portions spaced apart and an intermediate portion separate from and supported on said two connected portions, the end of one of the latter and the adjacent end of said intermediate portion being each adapted to receive independent supplies of gas.

4. A U shaped tubular member forming a main gas burner composed of two spaced portions and provided with a central tubular portion forming an auxiliary burner, said main and auxiliary burners being each adapted to be independently supplied with gas.

5. A gas burner comprising a tubular member substantially triangular in cross section and disposed with its lower side horizontal and provided with outlet orifices located substantially at the junction between said lower side and one of the upwardly extending sides.

6. A gas burner comprising a triangular tube having a longitudinally extending exterior rib and a row of gas jet orifices provided in said rib.

GEORGE W. GRAVES.

Witnesses:
STUART H. SWITZER,
LILLIAN M. KNOWLES.